March 27, 1934.  L. KOPINSKI  1,952,925

NONINDUCTIVE CONDENSER AND METHOD OF MAKING SAME

Filed Nov. 3, 1932

Inventor:
Louis Kopinski,
By Manning & Manning
Attys.

Patented Mar. 27, 1934

1,952,925

UNITED STATES PATENT OFFICE 1,952,925

NONINDUCTIVE CONDENSER AND METHOD OF MAKING SAME

Louis Kopinski, Cicero, Ill., assignor to John E. Fast & Company, Chicago, Ill., a corporation of Illinois Application November 3, 1932, Serial No. 640,966

4 Claims. (Cl. 175—41)

An object of this invention is to provide a condenser of the well known paper wound type which is non-inductive. Another object is to provide a method of making the same.

Heretofore it has been thought that certain condensers were inefficient at high radio frequencies because of a certain inherent "resistance". To determine this I made a series of tests with special testing apparatus and was convinced that the difficulty lay in inductance effects in these paper wound condensers, and that this inductance counteracted part of the capacity of the condenser with the net result that at high frequencies where inductance is greatest the capacity was greatly reduced.

To overcome this it has been necessary to use condensers which are larger than would otherwise be necessary. Another and more specific object therefore was to provide a wound condenser in which current would flow in and out with substantially no spiral effect.

These and other objects, as will hereinafter appear, are accomplished by this invention which is fully described in the following specification and shown in the accompanying drawing, in which—

Figure 1:
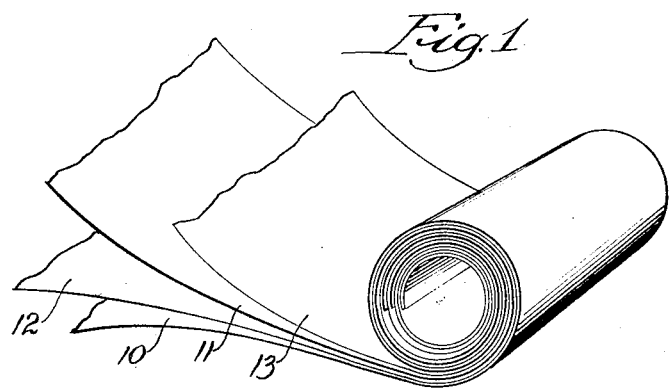
Figure 1 is a perspective of a condenser in process of being wound.
Figure 2:
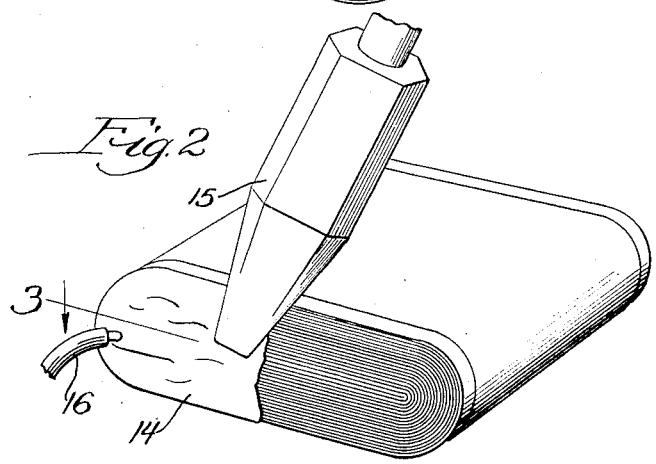
Fig. 2 is a perspective of the condenser having one of its ends in process of being soldered.
Figure 3:
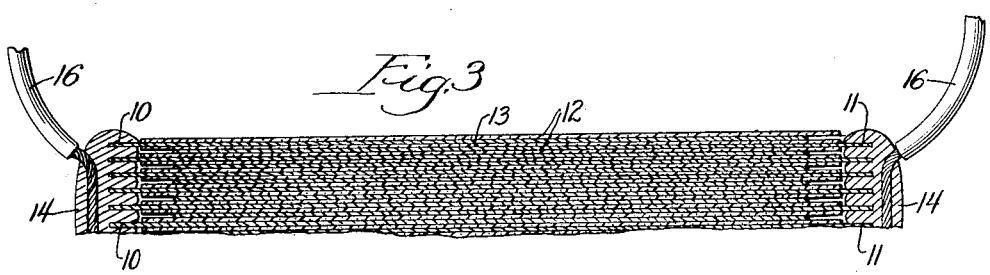
Fig. 3 is a partial enlarged section on the line 3 of Fig. 2.

The embodiment illustrated comprises a condenser in process of winding, being made of strips of tinfoil 10, 11 being wound between alternate strips of paper 12, 13, upon a mandrel (not shown). The strips of paper are superposed so that the ends of these strips are wound so as to lie in the same plane, as shown in Fig. 3, while the tinfoil strips 10, 11 extend from opposite ends of the condenser, as is also clearly shown in the enlarged section. After being wound the condenser is treated in various well known ways, such as by the introduction of a suitable insulating wax under heat and vacuum. These, however, form no part of the present invention and hence are not shown or described in detail.

To the ends of the foil of this condenser is applied solder 14 by means of a soldering iron 15 which is preferably electrically heated so as to better control its heat, which must be maintained between 355° F., and 365° F., and preferably at 360° F. The solder 14 has a composition of approximately 63% tin and 37% lead. When thus applied by an iron which is somewhat hotter than the melting point of the solder but which is lower than the melting point of the tin, the solder will melt and will flow into the interstices between the protruding ends of the strips of tin, as shown in Fig. 3, thereby making good electrical contact therewith. Terminals 16 are then soldered to the ends.

Tests of a condenser so made show that it is substantially free from inductance effects, and when used in a radio set is found to give satisfactory results over a very wide range of frequency. In actual test it is found that very much smaller condensers can also be used than has heretofore been thought possible. This is due to the fact that in a condenser having inductance at high frequency the inductance counteracted a large part of the capacity of the condenser, with the result that in order to have the sufficient capacity it was necessary to supply a larger condenser. With this condenser no such allowance need be made, with the result that a much smaller condenser can be used and its capacity remains substantially constant for all radio frequencies.

While I have shown and described but a single embodiment of my invention, it is to be understood that it is capable of many modifications. Changes, therefore, in the construction and arrangement may be made which do not depart from the spirit and scope of my invention as disclosed in the appended claims.

I claim:

1. A paper wound condenser having alternate strips of paper and tinfoil, the tinfoil extending beyond the paper at opposite ends of the condenser, all extending portions on each end being substantially uniformly connected to a substantially continuous block of solder, said solder completely filling the interstices between the extending foil edges so that current passing into or out of the condenser does so by a flow in a direction longitudinally of the axis of the condenser thereby eliminating substantially all inductive effects in the condenser.

2. The method of making wound condensers which comprises winding alternate strips of paper and tinfoil with alternate strips of foil extending beyond the paper at opposite ends of the condenser, flowing solder into the interstices between the extending edges of the foils throughout their extent and into contact with the edges of the paper strips to substantially uniformly unite with all of the foil edges and provide a terminal contact.

3. The method of making wound condensers which comprises winding alternate strips of paper and tinfoil with alternate strips of foil extending beyond the paper at opposite ends of the condenser, flowing solder composed of approximately 63% tin and 37% lead into the interstices between the extending edges of the foil and maintaining the flowing solder at a temperature of about 360° during such operation, to completely fill the spaces from the edge of the paper strip over the entire edges of the foil and provide a contact terminal.

4. The method of making a wound condenser in which alternate strips of paper and tinfoil are wound with alternate strips of tinfoil extending beyond the paper at opposite ends of the condenser, consisting of flowing solder over the exposed edges of the extending tinfoil and completely filling the interstices between the foil edges and the edges of the paper to provide a solid solder terminal substantially uniformly united with the entire edges of the foil.

LOUIS KOPINSKI.